Nov. 24, 1942.  J. F. CAMPBELL  2,302,673
MEASURING AND INDICATING APPARATUS
Filed Oct. 28, 1939   3 Sheets-Sheet 1
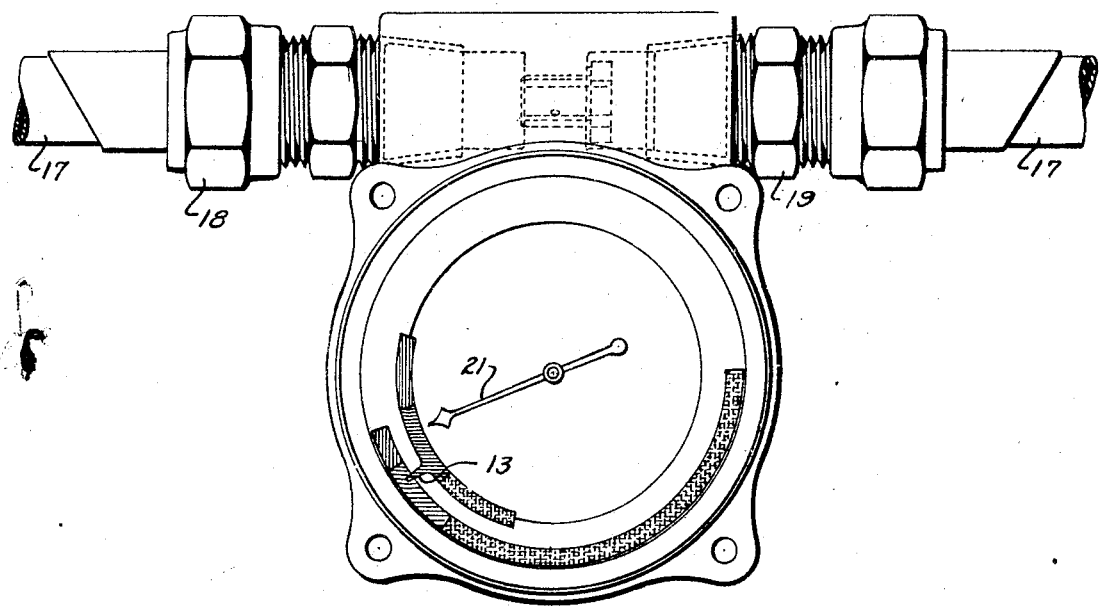
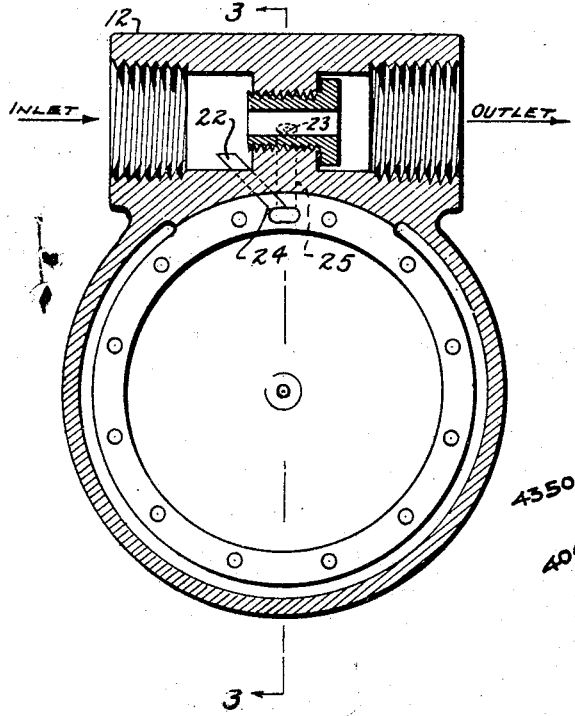
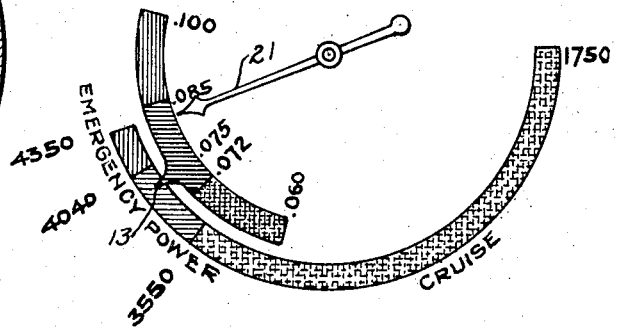
INVENTOR
J. F. CAMPBELL
BY
ATTORNEYS Nov. 24, 1942.  J. F. CAMPBELL  2,302,673
MEASURING AND INDICATING APPARATUS
Filed Oct. 28, 1939  3 Sheets-Sheet 2
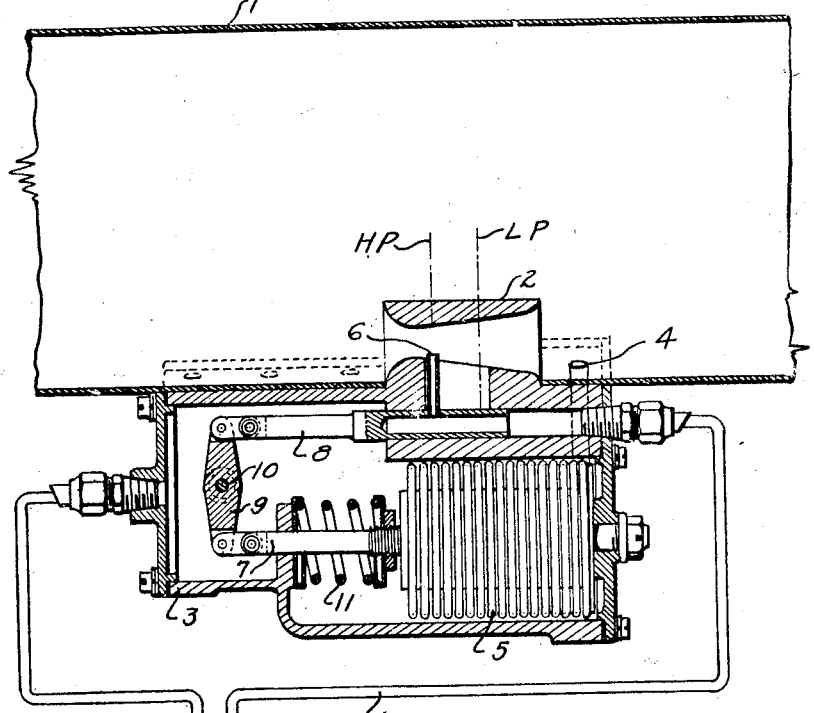
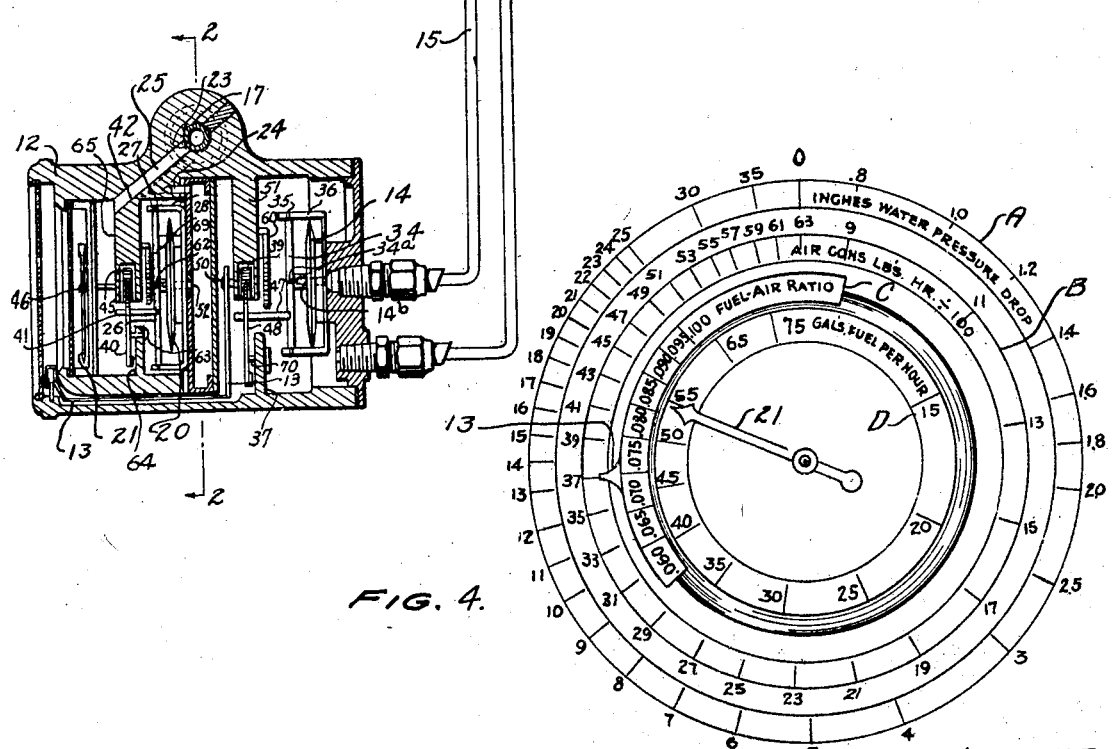
INVENTOR
J. F. CAMPBELL
BY
ATTORNEYS Nov. 24, 1942.   J. F. CAMPBELL   2,302,673
MEASURING AND INDICATING APPARATUS
Filed Oct. 28, 1939    3 Sheets-Sheet 3
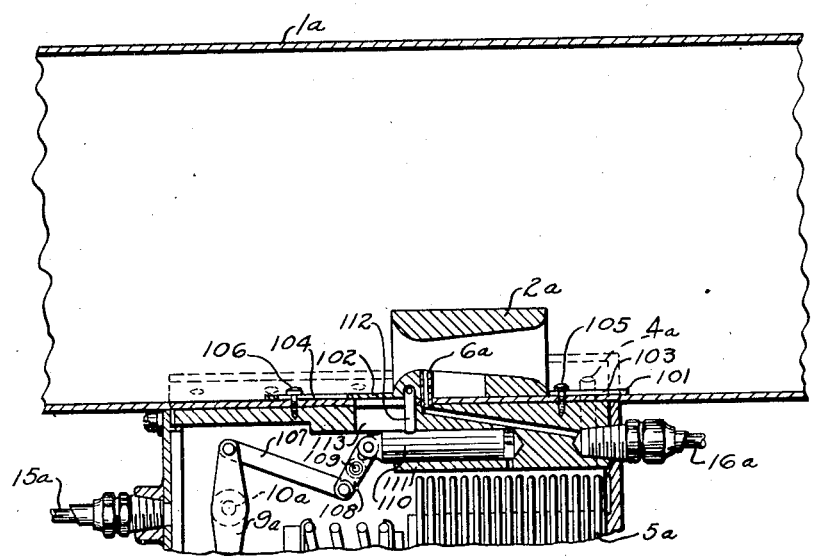
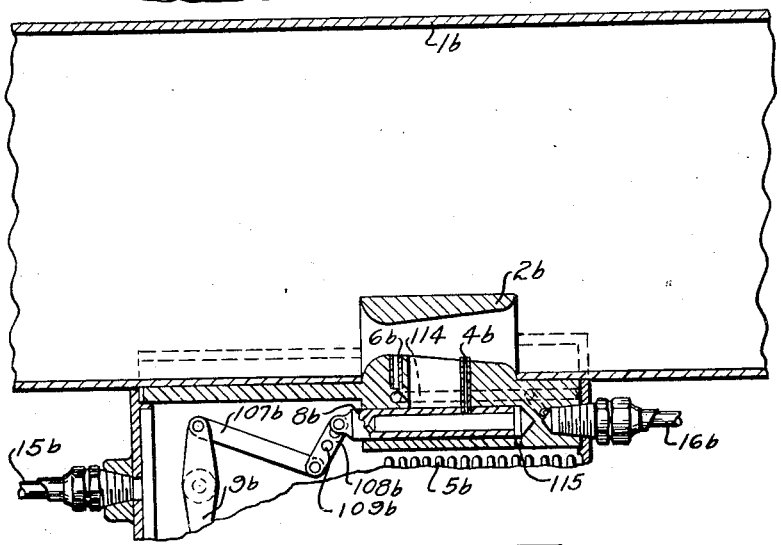
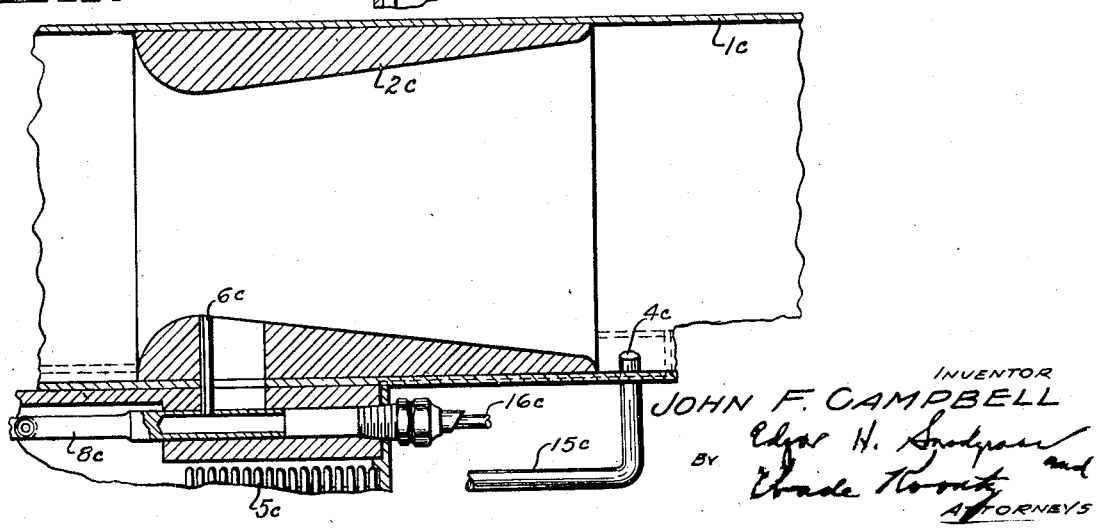
INVENTOR
JOHN F. CAMPBELL Patented Nov. 24, 1942

2,302,673

UNITED STATES PATENT OFFICE 2,302,673

MEASURING AND INDICATING APPARATUS

John F. Campbell, Dayton, Ohio

Application October 28, 1939, Serial No. 301,751

15 Claims. (Cl. 73—196)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for indicating, under different conditions of temperature and/or pressure and in units which are a function of density, the ratio of flow of a fluid which is practically non-responsive to temperature and/or pressure changes to a fluid which is responsive to temperature and pressure changes.

The invention more particularly relates to internal combustion engines on aircraft and to apparatus associated therewith for indicating in units which are a function of density, the ratio of fuel in liquid form to air supplied to internal combustion engines under variable pressure and temperature conditions.

It is well known that in an internal combustion engine the amount of air consumed by weight per B. H. P. per hour is practically constant throughout the major portion of the operating range of the engine. Since air density varies with temperature and/or pressure, it is readily appreciated that the volume of air must necessarily be varied in order to furnish the proper weight of air to the aircraft engines at different altitudes and temperatures.

It is also well known that the amount of fuel picked up by air as it flows through the throat of a carburetor is directly proportional to the square root of the density of the air. This results in a relatively rich combustible mixture at higher altitudes and requires a leaning out of the carburetor at such higher altitudes.

It is therefore an object of this invention to provide mechanism for indicating the rate of fuel consumption by weight, the rate of air consumption by weight, and the ratio of consumption of fuel to air, so that the pilot may operate suitable mixture control apparatus (not a part of this invention) to maintain a proper mixture of fuel and air.

It is another object of this invention to provide apparatus which will indicate, under different conditions of temperature and pressure and in units which are a function of the density, the ratio of flow of fluids having dissimilar densities and which are responsive to temperature and pressure changes.

It is still another object of this invention to provide measuring and indicating apparatus responsive to changes in temperature and pressure which will measure the volume flow of a gas and indicate the flow in units which are a function of the density.

It is a further object of this invention to provide an apparatus which will accurately indicate within practical limits the power being delivered by internal combustion engines.

In the drawings:

Fig. 1 is a front elevational view of the indicating mechanism shown attached to the fuel line;

Fig. 2 is a cross-sectional view taken along the line 2—2 of Fig. 3;

Fig. 3 is a cross-sectional view taken generally along the lines 3—3 of Fig. 2 but further including a cross-section through the air intake means and the mechanism for operating the indicating mechanism;

Fig. 4 is a front elevational view of the indicating mechanism showing the various indicia and the relationship of the indexing means thereto; and Fig. 5 is a detail view of a part of the indicating mechanism showing the relationship of the indexing pointers for a given fuel-air consumption condition.

Figures 6, 7 and 8 are views similar to a part of Figure 3 showing modified forms of the invention.

Referring to the drawings:

The mechanism forming the device generally comprises an air intake member 1; a measuring means 2 including mechanism responsive to temperature and pressure changes for measuring air flow through said passageway; a fuel conduit 17; means 22, 23, 24, and 25 for establishing a pressure difference whereby fuel flow through said conduit may be measured; and an indicating mechanism 12 operatively associated with said air-flow-measuring means and fuel-flow-measuring means for indicating the flow of air and fuel in units which are a function of density, and also for indicating the ratio of flow of fuel to air.

Referring to Fig. 3, air flow measuring means 2, comprising a venturi, is placed inside and calibrated with respect to intake member 1 so that the square root of the difference in pressure between different positions of tubes 6 and 4 is indicative of the flow in member 1 of a certain volume of air at a certain density. A greater or less flow of air through intake member 1 would result in a larger or a smaller pressure difference between the regions adjacent the entrances to tubes 6 and 4. Since the volume of flow is a function of the square root of the difference in pressure between different regions in said venturi, it follows that by varying said regions automatically in response to changes in temperature and/or pressure in such a way that a lower pressure difference exists for a given flow of low density air than for the same flow of higher density air, the flow of air is measurable in units which are a function of the density and may therefore be indicated directly by weight.

The pressure difference between tubes 6 and 4 operates diaphragm 14 at the center of which is attached a wire bridge 14b. This wire bridge presses against the short arm 34a of a bell crank composed of the short arm 34a, rotatable shaft 34 pivotally mounted on bracket 36 at 35, and long arm 47. Arm 47 of the bell crank is adapted to operatively engage a suitable cam surface on segmental gear 48 which, in turn, is pivotally mounted at 70 on housing projection 37 to cause rotation of the gear segment in response to movement of diaphragm 14. Gear 48 is adapted to mesh with pinion gear 39 integral with shaft 50 which, in turn, is rotatably mounted on housing projection 51. Indexing pointer 13 is also integral with shaft 50 to rotate therewith. A hair spring 60 attached at one end to housing projection 51 and at the other end to shaft 50 is adapted to maintain the parts in operative relationship. This structure is substantially as shown in the N. A. C. A. Report No. 420, page 28, Fig. 19, and descriptive matter in connection therewith. However, the cam surface on the cam member is properly designed to obtain the desired pointer movement. In operating diaphragm 14 as the result of the pressure difference between the regions adjacent the entrance to tubes 6 and 4, the pressure at the entrance to tube 4 is transmitted to one side of the diaphragm 14 through tube 4, sealed casing 3, and tube 15. Pressure at the location in the venturi of tube 6 is transmitted to the other side of diaphragm 14 through tube 16. Tube 6 is constructed and arranged to be movable by Sylphon tube 5, which is balanced against a given atmospheric pressure by means of a spring contained therein to move longitudinally in response to changes in pressure and/or temperature. Sylphon tube 5 is so calibrated with respect to the length of travel of tube 6 and the rate of change of area of the venturi that the square root of the difference in pressure between tubes 6 and 4 for the various positions of tube 6 is a measure of the flow of air in intake member 1 by weight. Tube 6 is operatively connected to the Sylphon by means of arms 7 and 8 pivotally connected to the opposite ends of lever 9, which in turn is operatively mounted on pin 10. As shown in Figure 3, the hollow end of arm 8 communicatively carries tube 6 and is slidably received in the passageway portion of member 2. Pipe 16 is attached to member 2 in communication with the passageway portion thereof. Spring 11 opposes expansion of tube 5 and regulates the expansion and contraction thereof in amounts proportionate to changes in temperature and/or pressure. Tube 4 communicatively connects the intake member 1 adjacent the exit of the venturi with the interior of sealed casing 3 so that the Sylphon will be subjected to the pressure of the air at the exit to the venturi.

As shown in Fig. 1, an indicating gauge 12 is connected into the fuel line by connections 18 and 19. Fuel consumption is measured as the result of the square root of the difference in pressure between the area at 22 (Fig. 2) and the restricted area at 23. The pressure at 23 is transmitted to the front of diaphragm 20 by means of passageway 25, and the pressure at 22 is transmitted to the rear of diaphragm 20 by means of passageway 24 and opening 52. The pressure difference between areas at 22 and 23 operates diaphragm 20, which, through wire bridge member 61 and short arm lever member 62 rotates shaft 26 pivotally supported at 27 on bracket 28. Arm 62, shaft 26 and arm 47 constitute a bell crank lever. Arm 41 operatively engages a cam surface on gear segment 40 which, in turn, is pivotally mounted at 63 on housing projection 64. Gear segment 40 meshes with pinion gear 45 integral with shaft 46, which, in turn, is integral mounted on housing projection 65. Also integral with shaft 46 is fuel index pointer 21. This structure is substantially identical with the disclosure in N. A. C. A. Report No. 420, page 28, Figure 19, and subject matter pertinent thereto with the exception that the surface of the cam 40 is suitably designed to obtain the desired pointer action. A hair spring 69 attached at one end to support 65 and at the other end to shaft 46, serves to maintain the parts in operative relationship.

Referring now to the construction of the indicating mechanism, and particularly to Figs. 3 and 4, scale A represents pressure drop in inches of water and is used only as a basis for the construction of scales B, C, and D. Scale A need not appear on the finished indicating mechanism. Scale B is laid out so that indexing means 13 indicates air consumed in hundreds of pounds per hour as a result of the square root of the pressure difference between the areas adjacent tubes 6 and 4, the pressure difference being readable on scale A. Indexing means 21 cooperates with scale D to indicate, in gallons per hour, the flow of fuel through tube 17 as a result of the square root of the pressure difference between areas 22 and 23, the pressure difference being readable on scale A.

Scale C, carried by and movable with pointer 13, is so constructed that, with pointers 13 and 21 in alignment, the fuel-air ratio indicated by pointer 21 is 3:40 or .075. Calibration of scale C has been accomplished by dividing the fuel consumption indicated by pointer 21, converted into units of weight, by air consumption indicated by pointer 13 in units of weight, marking scale C with the result, and positioning scale C in such a way that the scale is readable by pointer 21. Scale C is constructed as follows: Scales B and D are so calibrated and arranged with respect to each other that any radial line from the center of pointer 21 will intersect on scales B and D indications, the ratio by weight of which is a constant. In the instant invention, the weight of fuel is assumed to be six pounds per gallon. The fuel-air ratio is .075 when pointers 13 and 21 are in alignment, since any indication on scale D multiplied by six and divided by the corresponding alignment indication on scale B equals .075. Scale C is so constructed that the indication of pointer 21 on scale D multiplied by six and divided by the indication of pointer 13 on scale B, is indicated on scale C by pointer 21 as the fuel-air ratio by weight. In Figure 4, pointer 21 indicates on scale D the consumption of approximately 54 gallons or 324 pounds of fuel per hour; pointer 13 indicates on scale B the consumption of approximately 3700 pounds of air per hour; pointer 21 indicates on scale C the ratio of fuel to air which is the quotient of the fuel reading and the air reading or $$\frac{324}{3700}$$

which equals .087.

It is to be understood that scales B and D may be constructed having successively increasing spaces between graduations, to thereby avoid the necessity of compensating for pointer movement of increasingly larger increments for given increments of increase in velocity.

However, in the preferred embodiment of the invention, scales B and D are shown having decreasing spaces between successive graduations. Desired movement of the pointers 13 and 21 in response to movement of diaphragms 14 and 20 respectively, may be accomplished in a well-known manner such as by a restraining spring as disclosed in Report No. 420 of the National Advisory Committee for Aeronautics on Aircraft Speed Instruments, page 28, second column, third sentence. Or the pointer may be operated by a compensated cam as disclosed in Figs. 19 and 20 and accompanying description on page 28 of that report.

Scales C and D may be suitably marked by colors, or otherwise, to facilitate reading the same. For instance, between 1750 and 3550 pounds of air are consumed in the cruising range of the particular motor selected for B. H. P. requirements between 250 and 530; for normal power requirements, between 530 and 600 B. H. P., there is consumed between 3550 and 4040 pounds of air per hour; and for emergency power requirements of between 600 and 650 B. H. P. there is consumed between 4040 and 4350 pounds per hour. Similarly, the fuel-air ratio for cruising is between .060 and .072; normal power, between .072 and .085; and for emergency power, between .085 and .100. A color scheme adopted is yellow for cruising, blue for power, and red for emergency. The pilot observes the location of pointer 13 and operates the mixture control mechanism to bring pointer 21 to a position on scale C corresponding to the position of pointer 13 on scale B. As illustrated in Fig. 5, pointer 13 is approximately three-fourths of the way in the blue band of scale B and the pilot operates the mixture control mechanism (not shown) until pointer 21 is approximately three-fourths of the way into the blue band on scale C.

In the operation of the device, the pilot selectively sets the fuel-air ratio control means (not shown) for the flight conditions that he will immediately encounter. At low altitudes the pressure registering member 6 is adjacent the throat of the venturi in the portion indicated at H. P., the air is relatively dense, and a relatively small amount of air is required to supply the weight of air necessary for proper operation of the engines. At higher altitudes the Sylphon tube expands, member 6 occupies a variable position between extremes indicated by H. P. and L. P., depending upon temperature and pressure conditions. As tube 6 approaches the L. P. position, the pressure differential between regions adjacent the entrances to tubes 6 and 4 becomes less, necessitating the passage of a relatively larger quantity of air to register a given weight consumption than when tube 6 is nearer the H. P. position.

It is readily appreciated that applicant has provided a simple, accurate, and reliable apparatus for indicating in units which are a function of the weight, the flow of a fluid, the volume of which is responsive to temperature and/or pressure changes, the flow of fluid which is volumetric practically non-responsive to changes in temperature and pressure, and means for indicating the ratio of flow of the two.

Since the consumption of air in pounds per brake horsepower per hour is practically constant throughout the entire operating range, it is possible, by indicating the air consumption by weight, to indicate to a fair degree of accuracy the horsepower developed, regardless of the rotative speed of the engine, the altitude at which it is operating, and the temperature of the air in which it is operating.

It is obvious that various changes may be made that fall within the inventive scope of disclosure. For instance, the Venturi casing may be made movable and tube 6, stationary; or tube 6, stationary and tube 4, movable inside the venturi. The venturi may be made sufficiently large to constitute a sector of the intake member so that all of the air passes through the venturi. In the modified form of the invention shown in Figure 6, the Venturi casing is movable in response to changes in air density to change the relative position of the pressure measuring tube 6a with respect to the venturi. Venturi 2a is provided with extensions 101 and 102 slotted at 103 and 104 for the reception of guiding stud bolts 105 and 106. Lever 9a, corresponding to lever 9 in Figure 3 and similarly operated by Sylphon 5a corresponding to Sylphon 5, is pivotally mounted at 10a. Pivotally connected to the upper end of lever 9a is a link 107. Lever 108, pivotally mounted at 109 is pivotally connected at one end to link 107 and at the other end to piston 110, slidably received in member 111. Venturi 2a is connected to piston 110 to move therewith by means of member 112. Member 111 is provided with a cut-away portion 113 to permit sliding movement of 112 with respect thereto. It will be noted that the passageway in which piston 110 slides has an orifice corresponding to orifice 115 in Fig. 7.

In the modified form of the invention shown in Figure 7, tube 6b is made stationary with respect to the venturi 2b and is communicatively connected with tube 16b by orifice 114. Tube 4b is carried by arm 8b in communication with the hollow end thereof, which in turn is connected to the interior of casing 3 and tube 15b by orifice 115. Tube 4b is positioned longitudinally of the venturi in response to movement of Sylphon 5b by lever 9b connected to arm 8b by link 107b and lever 108b, which in turn is pivotally mounted at 109b.

In the form of the invention illustrated in Figure 8, the venturi 2c is placed inside the intake pipe 1c and is arranged so that the entire air-flow passes through the venturi. The hollow end of arm 8c communicatively carries tube 6c and is slidably received in the passageway portion of member 2c to which pipe 16c is communicatively attached. Tube 6c is positioned in response to expansion and contraction of Sylphon 5c in the same manner as tube 6 in Figure 3. Pressure opening 4c is connected directly to tube 15c in this embodiment in lieu of through the casing as in Figure 3. The form of invention in Figure 8 is the least desirable because this arrangement provides the greatest interference with the flow of air through the intake pipe. By providing each passageway with a venturi and density responsive pressure measuring and indicating mechanism, the invention is adapted to be used to indicate the flow by weight of fluids which are variably responsive to temperature and/or pressure changes.

It is to be understood that the written description taken in connection with the drawings is by way of illustration only and is not to be taken in any way as limiting the spirit or scope of this invention. It is intended to be limited only by the terms of the appended claims.

I claim:

1. A device for indicating the ratio, by weight, of the passage of fluids through separate conduits, comprising Venturi means operatively associated with one of said conduits; a plurality of pressure-registering means located at different velocity regions and said venturi; means responsive to changes in temperature and/or pressure for moving one of said pressure-registering means so that predetermined pressure differentials exist for different densities of a given volume; indexing means operated as a result of and proportional to the pressure differential between said pressure-registering means; scale means upon which flow is indicated by said indexing means; means for measuring flow through a second conduit; a second scale means; and means operated by said flow-measuring means for indexing flow on said second scale, said first and second scales being arranged in a predetermined ratio relationship, a ratio scale being carried by one of said indexing means—the other of said indexing means serving also as indexing means for said ratio scale to indicate the ratio of flow between said conduits.

2. Apparatus for measuring air flow, comprising an air passageway; means for producing for a given flow-variable pressure regions in said passageway; manometer means having a fixed portion and a movable portion operatively associated with said variable pressure producing means, said portions being associated with said different regions for measuring the volume of flow through said passageway; and means for moving said movable portion to different pressure regions in response to changes in temperature and/or pressure whereby the difference in pressure registered by said manometer means varies with air density.

3. Apparatus for measuring air flow, comprising an air passageway; means for producing for a given flow-variable pressure regions in said passageway; and manometer means having portions associated with at least two of said regions for measuring volume of flow through said passageway, means for moving one of said portions of said manometer means to different pressure regions in response to changes in temperature and/or pressure in such a way that for a constant flow the pressure difference varies with air density whereby flow is measured by weight.

4. Apparatus for measuring air flow, comprising differential-pressure means and means operatively associated with said differential-pressure means for measuring air flow as a function of said pressure differential, said pressure-differential means comprising, under a condition of constant volume flow, a pressure means located in a region of relatively low velocity and a pressure means located in a region of high velocity, means for moving one of said pressure means in response to changes in pressure and/or temperature to a velocity area that will maintain a predetermined relationship between the density of the air and the difference in pressure between said two pressure means.

5. Apparatus for measuring and indicating air flow, comprising air intake means; Venturi means precalibrated with respect to and operatively associated with said air intake means; means for measuring and indicating air flow, said means operating as the result of a difference in pressure between longitudinally spaced regions in said Venturi means; and means responsive to changes in air density for varying at least one of said regions whereby air flow is indicated in units which are a function of air density.

6. Apparatus for measuring and indicating air flow, comprising air intake means; Venturi means precalibrated and operatively associated with said air intake means; means for indicating air flow, said means operating as the result of a difference in pressure between selected regions in said Venturi means; and means for automatically varying said regions in response to changes in temperature and/or pressure and so constructed and arranged that the pressure differential between said regions is a function of air density whereby air flow is indicated in units which are a function of air density.

7. Apparatus for measuring and indicating air flow through an air intake means, comprising Venturi means precalibrated with respect to and operatively associated with said air intake means; pressure-transmitting means located in a low pressure region of said venturi; a second pressure-transmitting means located in a high pressure region of said venturi, means for moving one of said pressure-transmitting means to maintain for a given rate of flow a predetermined ratio relationship between the differential of pressure between said two pressure-transmitting means and the air density; and indicating means operatively connected to said two pressure-transmitting means for indicating air flow in units which are a function of air density.

8. Apparatus for measuring and indicating air flow through an air intake means, comprising Venturi means precalibrated with respect to and operatively associated with said air intake means; pressure-registering means located in a low pressure region of said venturi; a second pressure-registering means located in a relatively high pressure region of said venturi; means responsive to changes in air density for moving one of said pressure-registering means in such a manner that the pressure differential between said two pressure-registering means varies as a function of air density; and indicating means operated as the result of the pressure difference between said two pressure-registering means whereby air flow is indicated in units which are a function of the weight.

9. In combination, fuel intake means, means for indicating the rate of fuel flow by weight, air intake means, Venturi means precalibrated with respect to and operatively associated with said air intake means, means for measuring air flow, said last-named means operating as the result of a difference in pressure between longitudinally spaced regions in said Venturi means, means responsive to changes in air density for varying at least one of said regions whereby air flow is indicated in units which are a function of air density, and indicating means correlated with said two measuring means for indicating the ratio of flow by weight of fuel to air.

10. In combination: means for measuring the rate of fuel consumption by weight; means for measuring the rate of air consumption by weight including an air passageway, means for producing a pressure gradient between different regions of said passageway, manometer means having pressure transmitting members operatively associated with at least two of said regions for measuring volume of flow through said passageway, means for moving one of said members in response to changes in temperature and/or pressure in such a way that for a constant flow, the pressure difference varies with air density and the flow is measured by weight; and means correlated with said two measuring means for indicating the ratio of consumption of fuel to air.

11. Apparatus for measuring and indicating air flow through an air intake means, comprising an air intake means having pressure gradient producing means therein; pressure-registering means located in a low pressure region of said air intake means; a second pressure-registering means located in a high pressure region of said air intake means; means responsive to changes in air density for moving one of said pressure-registering means in such a manner that the pressure differential between said two pressure-registering means varies as a function of air density; and indicating means operated as the result of the pressure difference between said two pressure-registering means whereby air flow is indicated in units which are a function of weight.

12. Apparatus for measuring the flow of a fluid of variable density comprising a fluid passageway, means for creating pressures at different points in said passageway which differ from one another in accordance with the velocity of flow through said passageway, means for measuring differential pressures including fluid transmitting means operatively positioned at said different points, and means responsive to variations in density of the flowing fluid for changing the relative position of said fluid transmitting means.

13. A device as recited in claim 8 in which said movable one of said pressure-registering means is located in a low pressure region of said venturi.

14. A device as recited in claim 8 in which said movable one of said pressure-registering means is located in a relatively high pressure region of said venturi.

15. A device for indicating the ratio, by weight, of the flow of fluid through separate conduits, comprising separate fluid conduits, means for producing a pressure gradient between different regions of each of said conduits; volume measuring manometer means having a fixed portion and a movable portion operatively associated with each of said pressure gradient producing means, means for moving said movable portion to regions of different pressure in response to changes in temperature and/or pressure whereby the difference in pressure registered by said manometer means varies with fluid density, and indicating means operated by said manometer means for indicating the ratio of flow through said conduits.

JOHN F. CAMPBELL.